United States Patent [19]
Winter

[11] 3,771,918
[45] Nov. 13, 1973

[54] LINEAR POSITIVE DISPLACEMENT PUMP WITH ROTARY TO RECIPROCATING DRIVE

[76] Inventor: Augustus P. Winter, 8373 Cliffridge Ln., La Jolla, Calif. 92037

[22] Filed: July 24, 1972

[21] Appl. No.: 274,676

[52] U.S. Cl.................. 417/266, 74/57, 92/136, 417/19
[51] Int. Cl. ...... F04b 3/00, F16h 25/16, F01b 9/06
[58] Field of Search.............. 74/25, 424.8, 57–59; 92/136; 417/266, 269, 319

[56] References Cited
UNITED STATES PATENTS

| | | | |
|---|---|---|---|
| 761,598 | 5/1904 | McCall | 417/266 X |
| 522,249 | 7/1894 | Buckley | 74/59 |
| 673,208 | 4/1901 | Kramer | 74/57 |
| 2,275,640 | 3/1942 | Nardone | 92/136 X |
| 2,604,788 | 7/1952 | Hauber | 74/57 X |
| 2,891,408 | 6/1959 | Burt | 74/59 |
| 3,159,046 | 12/1964 | Harned | 74/58 X |
| 3,499,342 | 3/1970 | Ligh | 74/424.8 X |
| 3,630,327 | 12/1971 | Nelson | 74/424.8 X |
| 3,668,940 | 6/1972 | Avena | 74/57 X |

FOREIGN PATENTS OR APPLICATIONS

| | | | |
|---|---|---|---|
| 7,149 | 7/1898 | Norway | 74/57 |
| 7,150 | 7/1898 | Norway | 74/57 |
| 7,151 | 7/1898 | Norway | 74/57 |

Primary Examiner—William L. Freeh
Assistant Examiner—John T. Winburn
Attorney—Robert L. Parker et al.

[57] ABSTRACT

A multiple stage, linear, reciprocating, balanced-unopposed compressor is driven by an analog of a turnbuckle with the drive having first and second pairs of associated recirculating ball bearing nuts and screws. The ball bearing nuts are constrained against axial displacement and are driven by a source of rotary power. The pairs of recirculating ball bearing nuts and screws are oppositely threaded and the screws are coupled together for reciprocation together. The screws are successively braked to produce reciprocation. The screw under power compresses gas in a plurality of stages in an isomer by driving a plurality of pistons. When the power stroke of a screw is completed, its brake is released and the other screw braked to compress gas in a second isomer identical with the first. The compression cylinders in each isomer are disposed in a manifold which can be used to collect blow-by gases or as a cooling jacket. A cylinder of each isomer is the source of gas for the next higher stage cylinder in the other isomer until the highest stage is reached. The stroke of the compressor is variable for warmup purposes.

21 Claims, 7 Drawing Figures

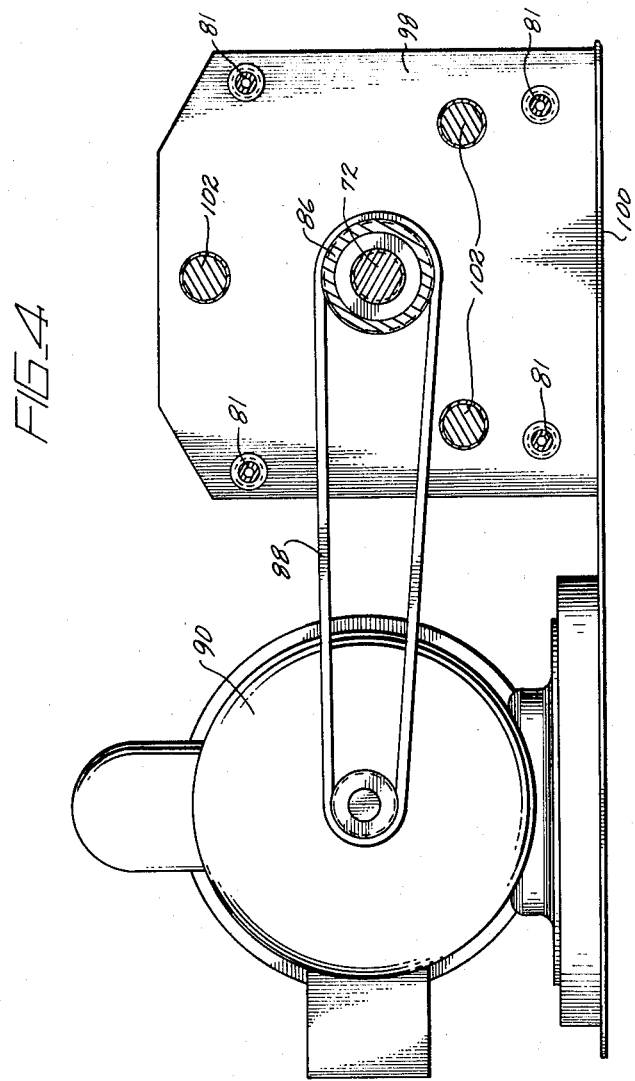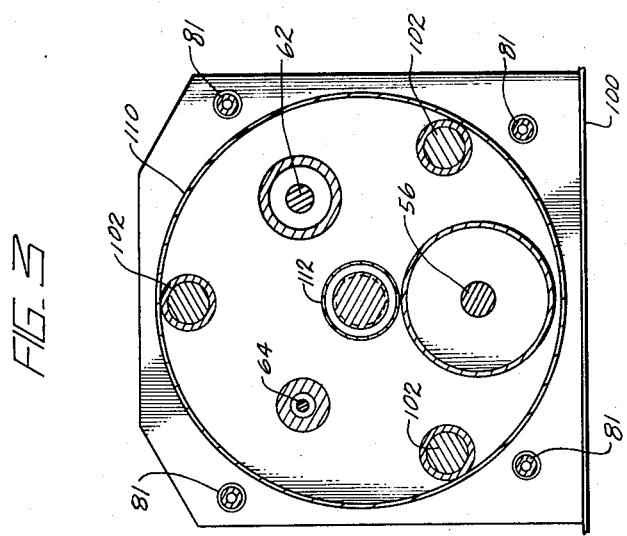

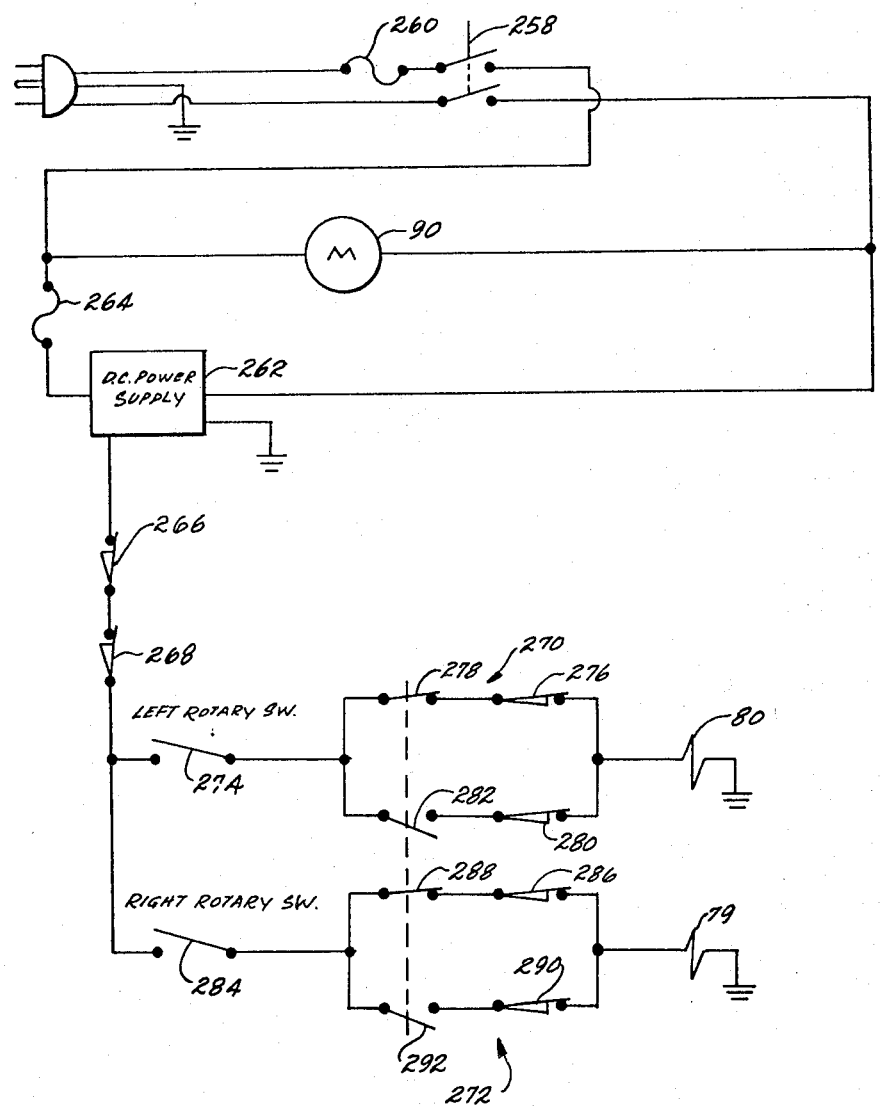

LINEAR POSITIVE DISPLACEMENT PUMP WITH ROTARY TO RECIPROCATING DRIVE

BACKGROUND OF THE INVENTION

The present invention relates to pumps in general embracing both pumps and compressors and, more particularly, to reciprocating compressors and pumps.

Pump include compressors for increasing the energy state of gases and pumps for increasing the energy state of liquids. Pumps as used herein, therefore, mean both compressors and pumps.

Reciprocating compressors and pumps are used to increase the energy state of a fluid typically by increasing the fluid pressure. The increase in the energy of the fluid is usually used to move the fluid or to do some other useful work.

The most popular previously shown reciprocating compressor or pump designs employ one or more pistons and cylinders with the pistons being driven by a crank. An example is a radial engine compressor. Each piston is connected to the crank by a connecting rod and is constrained to move back and forth within a cylinder with the cylinder cofining the piston to its path. The distance the piston reciprocates is determined by the throw of the crank. Unfortunately, truly linear reciprocation of the piston is not possible because the piston is always subjected to a lateral component of force which tends to force it against the wall of its confining cylinder. The lateral force is essentially always present because the connecting rod is only aligned with the axis of the cylinder twice during a revolution of the piston and the connecting rod transmits the force for compression or pumping to the piston. One consequence of the lateral force to a cylinder is that it is difficult to seal a piston against a dry cylinder wall, for effective seals made of soft material wear out rapidly where lateral loads are present. Effective seals made of hard materials must be lubricated. In many applications, however, oil is a contaminant and is simply not a satisfactory addition to working fluid being compressed or pumped. One consequence of oil in compressed gases is decomposition of the lubricant in the inlet and outlet valves of the cylinders which causes valve malfunction through burning and continual maintenance. Another consequence of oil in compressed gases such as air is that the combination of adiabatic heat with pressure can lead to explosive conditions. It is therefore apparent that truly linear reciprocation is highly desirable to oil-free compression.

It is noted in addition that truly linear reciprocation admits to unlimited piston stroke lengths. An eccentric or crank-throw arrangement is limited as to piston stroke length by reason of the fact that a connecting rod will interfere with the cylinder wall if stroke length is increased to a comparable cylinder diameter-to-stroke length ratio. Since any piston cylinder arrangement admits to a finite dead space because of valve spacing requirements and the like, this is a major source of volumetric inefficiency. In a given system with the same dead space, a short stroke system suffers from a higher geometric volume inefficiency because the dead space to swept volume ratio is higher. Therefore, for a comparable output, the short stroke system must cooperate at higher speeds. A high speed system imposes serious valve problems. As a general rule, the faster the speed of a system, the shorter is its life. Valves are a particularly vulnerable element in this regard. The faster a valve operates the more massive it must be designed in order to withstand increased stress. This increase mass results in sensitive wear surfaces and higher noise and vibration levels.

Today, linear reciprocation is sought by the use of a cross-head and interpiece arrangement in which a primary piston is driven by a crank throw which in turn drives a secondary piston in a cylinder. The cross-head arrangement is not truly oil-free due to packing seal leakage, nor is it truly linear. It also has the disadvantage of increased numbers of parts such as the secondary piston, its interpiece, packings and the like.

SUMMARY OF THE INVENTION

The present invention provides a truly linear reciprocating pump for increasing the energy of gaseous or liquid fluids. The pump of the present invention is characterized by negligible lateral force acting on its cylinder walls by its pistons. The pump has the ability: to be driven at a very low speed, yet providing high output capacity; to use oil-free seals; to have high geometric volume efficiency; to use light valves; and to be simple in construction.

The pump of the present invention employs a unique drive, the understanding of which is helpful in understanding the invention. In turn, the drive can be readily understood with the help of a common turnbuckle. The common turnbuckle has axially aligned, oppositely threaded screws in a rectangular frame. If the frame is rotated at a constant speed and constantly in the same direction, those screws will rotate with it. If the rotation of one of the screws is stopped, it will move relative to the rotating frame. By externally connecting the screws together when the rotation of one is stopped, both move linearly with respect to the frame. Alternately, stopping the screws at the right time produces reciprocation.

By reducing the friction losses associated with common threads as through the use of recirculating ball bearings, simple rollers, or the like, an efficient and effective drive results.

With this background, the improved reciprocating pump for increasing the energy of a fluid of the present invention in a broad form has at least one bank having at least one piston and cylinder. The piston is translationally received in the cylinder. Fluid inlet means and fluid outlet means to the cylinder for the admission and discharge of fluid, respectively, are provided. The fluid inlet and outlet means may be in the form of check valves. A drive is coupled to the piston for the latter's reciprocation, the drive finding its analog in the turnbuckle described immediately above. The drive comprises a first and second pair of nuts and screws, with the nut of each pair being threadably received on its associated screw. The nut and screw pairs are oppositely threaded. Of each nut and screw pair one is a drive member and one is a driven member. Low friction means, such as the recirculating-ball bearings or simpler rollers, is provided between the threads of each nut and screw pair. Means for driving the drive members in rotation is provided, such as an electric motor. Means is also provided for preventing linear translation of each of the drive members with respect to its driven member. The driven members are coupled together for reciprocation together, and means such as brakes are provided for alternately producing rotation of each of the drive members with respect to its driven member to produce linear reciprocal motion of the driven member.

A particular form of the present invention contemplates a reciprocating pump for increasing the energy of a fluid, for example, a compressor. The device has a base which mounts first and second parallel medial plates. Disposed outwardly of the first and second medial plates and generally parallel to them are first and second parallel lateral plates. The lateral plates may also be secured to the base. The four plates are aligned in series so that a central axis passes through each of the plates. A first screw is translationally disposed along the central axis between the first medial and first lateral plates. Similarly, a second screw, oppositely threaded from the first, is disposed between the second medial and lateral plates for translation along the central axis. The first and second screw each carries a pilot plate which is prevented from rotating by such means as a plurality of guide rods. Each of the pilot plates mounts a brake which is selectively activatable to stop rotation of its associated screw. The screws are driven by associated first and second nuts rotationally mounted along the central axis between the medial plates. The nuts are prevented from translating by the medial plates. Low friction means such as recirculating ball bearings or simple rollers are provided between the threads of each nut and screw. A source of unidirectional rotary power, such as an electric motor, is provided to drive the nuts in rotation. Each nut and screw pair has an associated isomer of pistons and cylinders with each isomer having a plurality of pistons and cylinders mounted between the medial and lateral plates periaxially to the central axis. The number of piston and cylinder combinations in one isomer corresponds to those in the other isomer and each piston and cylinder combination has a corresponding combination in the opposite isomer. Inlet and outlet means for each of the cylinders is provided to admit and discharge fluid from the cylinder at predetermined inlet and outlet pressures.

Preferably, the reciprocating pump of the present invention has each of the first and second piston and cylinder combinations of each isomer increasing progressively from a low pressure piston and cylinder combination to a high pressure combination. Means is provided for connecting the outlet means of a lower pressure cylinder to the inlet means at the next higher pressure cylinder in the opposite piston and cylinder isomer. It is also preferred to enclose the pistons and cylinders of each isomer between an inner and outer shell. The inner shell receives the screw of the isomer and the outer shell circumscribes the isomer's cylinders to develop an annular space which is bounded at its ends by the medial and lateral plates, respectively. This annular space can serve as collection space for blow-by gases in certain closed and passively cooled systems or can serve as an efficient cooling jacket in those systems requiring active cylinder cooling.

These and other features, aspects and advantages of the present invention will become more apparent from the following description, appended claims and drawings.

BRIEF DESCRIPTION OF THE FIGURES

FIG. 3 is a view taken along lines 3—3 of FIG. 2;

FIG. 4 is a view taken along lines 4—4 of FIG. 2;

FIG. 6 is a line schematic illustrating a suitable circuit for operation of the pump of the present invention.

DESCRIPTION OF THE PREFERRED EMBODIMENTS

Figure 1:
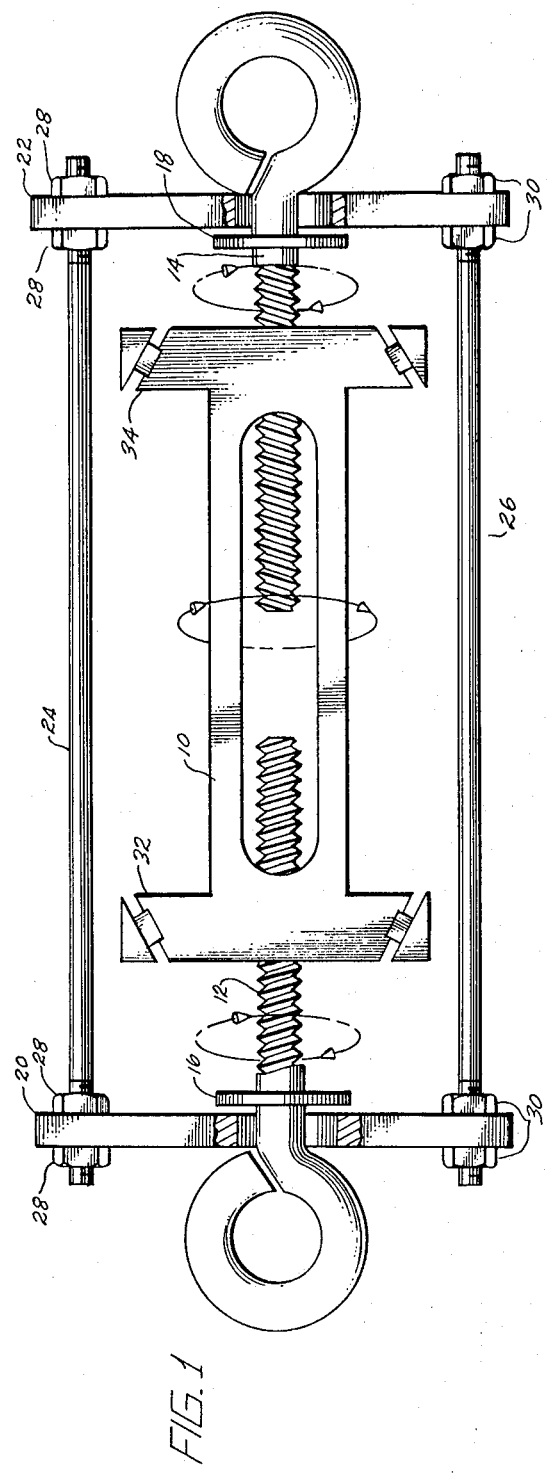
FIG. 1 is a side elevational, simplified view of a drive which is presented for the purpose of understanding the present invention.

FIG. 1 illustrates in general a "turnbuckle" device which is used in the reciprocating pump of the present invention. It is thought that an understanding of the device will make understanding of the invention clearer.

In the Figure a frame 10 receives in threads a pair of oppositely threaded screws 12 and 14. The frame and the screws constitute the familiar turnbuckle. If the frame is driven in rotation by a rotary prime mover, it will drive both screws with it. If the rotation of one of the screws is stopped, as by a brake, while the frame is being driven, the screw which is stopped will move linearly with respect to the frame and the other screw. If the screws are coupled together for linear movement together, stopping the rotation of one screw produces linear movement of both screws provided that the mechanical efficiency of each screw-nut combination is of the order of 50 percent or better. If, in addition, means are provided to overcome the inefficiency of the class Acme screw threads (common to the turnbuckle), efficient and practical linear movement from unidirectional rotation results. Finally with alternate braking of the screws, efficient reciprocation takes place. Under these circumstances the prime mover operates at or near its design speed, which is most efficient, and the brakes operate with minimum drag, which is their most efficient mode of operation. These features coupled with the use of the efficient ball-bearing screws make for a practical turnbuckle drive to produce linear reciprocation.

The means for coupling the turnbuckle of screws 12 and 14 and their joining frame 10 are the other items shown in FIG. 1. Each screw is coupled to the other for simultaneous translation while permitting the screws free rotation when not braked. For this purpose, screw 12 has a washer-like member 16 affixed to it and screw 14 has a similar washer-like member 18 affixed to it. Between curled ends of screws 12 and 14 and washer members 16 and 18 are plates 20 and 22, respectively. The plates are parallel to each other and at right angles to the line of reciprocation of the screws. Tie rods 24 and 26 are secured to the plates by nut sets 28 and 30 to complete the translational coupling of the screws. The ends of frame 10 are firmly constrained against translation as through thrust bearings 32 and 34 secured to a stationary base, which has been omitted from the Figure. The screw and frame threads are replaced by low friction "threads" shown explicitly in the preferred embodiment which will be described subsequently.

By rotating the frame as before, both screws will assume a similar speed and direction of rotation. The drive can be said to idle at a constant speed, the speed of the prime mover. If one of the screws is stopped by the application of an external brake it will move outwardly (with the threads and rotational sense shown in the Figure obtaining). Since it is coupled to one of the plates in this movement, the plate moves in association with the screw. Because both plates are attached by means of the tie rods, the movement of one plate causes the second plate to follow in direction and at the speed of the first plate. In this manner the spacial relationship of both screws is always maintained. The spacing between the screw ends in frame 10 is dynamically fixed.

Figure 2:
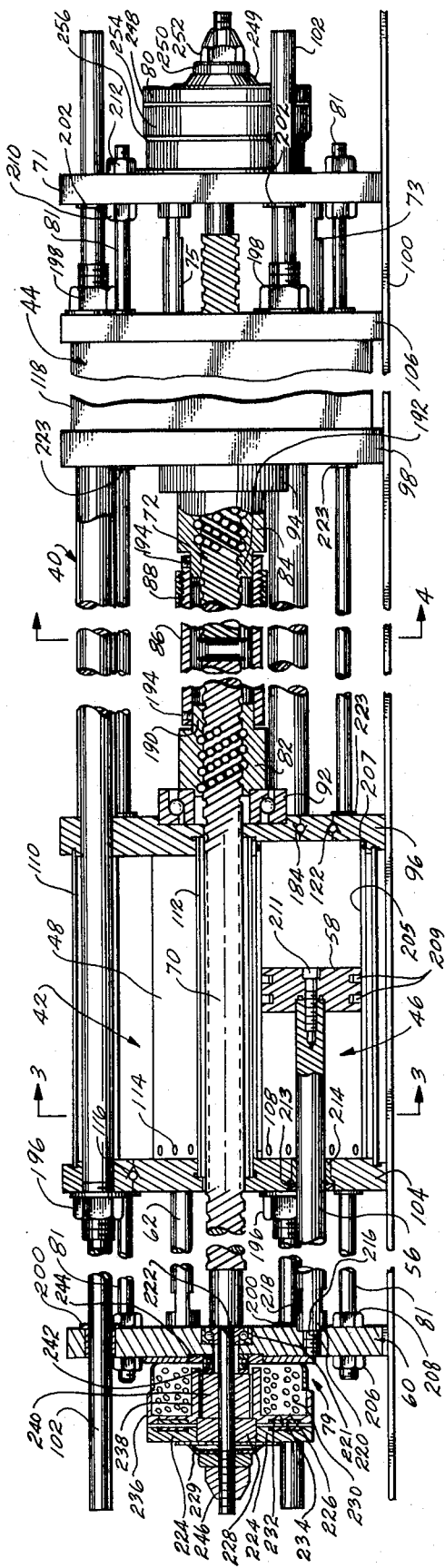
FIG. 2 is a side elevational view, partly in half section, and partly foreshortened, of the preferred form of the pump for increasing the energy of a fluid of the present invention.

With reference to FIG. 2, the preferred embodiment of the reciprocating pump for increasing the energy of a fluid of the present invention is illustrated. While the description is specific to a compressor, the principles set forth in this description apply as well to a pump for liquids.

In FIG. 2, a three-stage, pneumatically balanced and opposed piston compressor system 40 is shown. The compressor has identical compressor banks in the form of isomers 42 and 44. Each compressor isomer is shown having three compression stages of three cylinder and piston combinations for progressively increasing the pressure of a gas. As subsequently presented, the first stage of an isomer is pneumatically coupled to the second stage of the oppositely located isomer; the second stage of that isomer is pneumatically coupled to the third stage of the first isomer. The output from the third stage of each isomer is coupled in parallel and admitted to a pressure control valve. The pressure setting of this valve determines the internal pressure of the system and affords pneumatic balance to this balance unopposed piston pump. When the pressure setting is reached by the production of pneumatic pressure, the compressed gas is emitted to an accumulator tank at that pressure.

The construction of each cylinder and piston combination is typified by a first or low stage cylinder and piston combination 46 of isomer 42. The other stages in isomer 42 and the stages in isomer 44 are only partially shown in FIGS. 2 and 3 and are shown schematically in FIG. 5. Thus isomer 42 also has intermediate and high pressure stage cylinder and piston combinations 48 and 49, respectively. Isomer 44 has low, intermediate and high pressure stage cylinder and piston combinations 50, 52 and 54, respectively.

The force on each piston in each isomer is equal to the force on each other piston in that isomer. The total force in compression on all the pistons in an isomer is equal to the number of pistons times the force on any one of the pistons of that isomer.

For compressor isomer 42, a piston rod 56 connects a piston 58 of low pressure stage 46 to a pilot plate 60. Similar piston rods shown at 62 for a piston 66 (FIG. 5) of second stage cylinder 48 and a piston 68 (FIG. 5) of stage 49 (FIG. 5) connect these pistons to the pilot plate. Pilot plate 60 is carried for translation by a recirculating ball bearing-screw 70.

For isomer 44 on the opposite side of the compressor, a pilot plate 71 is carried by a recirculating ball-screw 72. These screws correspond to screws 12 and 14 of the turnbuckle drive previously discussed.

Figure 5:
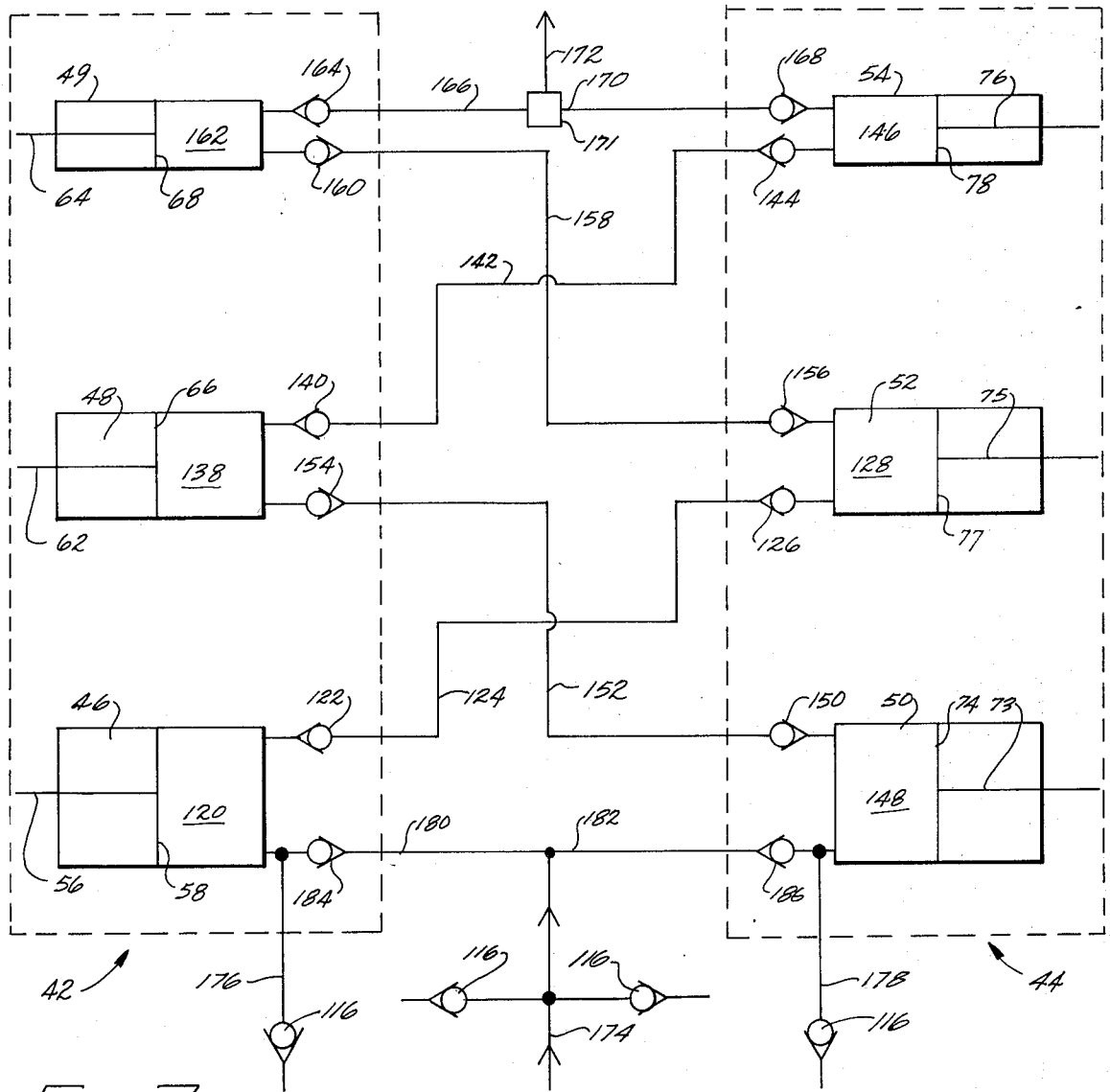
FIG. 5 is a line schematic illustrating the interconnection of the stages of the reciprocating pump of the present invention.

With reference to FIGS. 2 and 5, pilot plate 71 is connected to the pistons in isomer 44 in a manner identical to the connection of pilot plate 60 with the pistons of isomer 46. Thus, a piston rod 73 from a piston 74 in stage 50 couples the piston to the pilot plate, and for intermediate and high pressure stages 52 and 54 piston rods 75 and 76 connect pistons 77 and 78 to the pilot plate.

Each of the pilot plates carries a brake for stopping rotation of its associated screw. Thus, for screw 70 and pilot plate 60 a brake 79 is provided, and for screw 72 and pilot plate 71 a brake 80 is provided.

As in the FIG. 1 turnbuckle device, a plurality of tie rods 81 connect the pilot plate for translational movement together.

Screws 70 and 72 are driven by recirculating ball bearing nuts 82 and 84, respectively. These recirculating ball bearing nuts are coupled together for rotation through a sleeve 86. Sleeve 86, in turn, is driven by a belt 88 from a source of rotary power, such as a unidirectional, constant speed motor 90 (see FIG. 4). Recirculating ball bearing nuts 82 and 84 are prevented from moving axially by thrust bearings 92 and 94 which are secured in stationary medial plates 96 and 98. The thrust bearings reduce frictional losses between the ball bearing nuts and the medial plates. Medial plates 96 and 98 are anchored to a frame or base 100.

As in the turnbuckle drive analog, rotation of the recirculating ball bearing nuts rotate the screws with them. However, upon the application of a braking force on one of the screws which produces relative rotation between the braked screw and the recirculating ball bearing nut it receives, the braked screw will move linearly inward or outward of the center of the compressor depending on the sense of rotation of the nuts. Because the screws are attached to the pilot plates and the pilot plates are attached to each other through the tie rods, translation of one screw produces translation of its associated screw in the same direction and at the same translational rate of speed. However, the screw which has no braking force applied to its will rotate at twice the rotational speed of the sleeve when the complementary screw is braked to a complete stop.

Pilot plates 60 and 71 are prevented from rotating by any convenient means such as a plurality of stationary guide rods 102 fixed to a pair of stationary lateral plates 104 and 106, the lateral plates being secured through the guide rods to the medial plates and to frame 100. The guide rods extend through bearing bushing holes in the pilot plates in such a manner as to permit translation of the pilot plates with respect to them.

Before progressing with the detailed description of the preferred embodiment of the present invention a brief description of how the compressor works will be given to make the further description more meaningful.

Assume that right-hand screw 72 is in its outer position furthermore to the right in FIG. 2. The activation of brake 80 will cause the screw to move to the left in the Figure. This will also cause pilot plates 71 and 60 to move to the left in the Figure and compress gas in each of the compression stages of compressor isomer 44. At the end of this compression stroke, brake 80 is released, a programmed dwell occurs, and brake 79 is applied, causing left-hand screw 70 to move inwardly toward the center of the compressor to compress gas in isomer 46.

Provision is made in each compression stage to recirculate blow-by gases which pass from the compression end of the cylinder to the opposite side of the piston. This refers to the single acting piston. A double acting piston would have a comparable arrangement. In FIG. 2, circumferentially disposed holes 108 in stage 46 permit such blow-by gases to pass into an annularly shaped manifold bounded by an outer shell 110 and an inner shell 112. The outer shell circumscribes and encloses cylinders 46, 48 and 49. Inner shell 112 closes a space interiorly of the cylinders which defines a passage for screw 70. Both the inner and the outer shells are sealed in medial plate 96 and lateral plate 104 to close the ends of the manifold. Each cylinder of each stage has such a plurality of holes, as indicated for cylinder 48 by holes 114. When the pressure within the annulus reaches a predetermined value, preferably very low, a check valve 116 opens to admit gas into a line for ultimate recompression in the first stage of compression in either the right or left isomer. A similar arrangement is provided for isomer 44 but is not expressly shown in FIG. 2 except for an outer annular shell 118.

The compressor isomers cooperate with one another such that upon discharge of compressed gas from a lower stage to a higher state of compression dynamic balance will be maintained. That is, the pneumatic force of compression counterbalances the unopposed piston masses, as by a pneumatic spring. This is done by having the discharge from the lower stages in one compressor isomer provide the input for the next higher stages in the complementary isomer. Thus, in the embodiment illustrated and with reference to FIG. 5, first stages 46 and 50 will discharge, respectively, into second stages 52 and 48. Second stages 48 and 52 will discharge into high pressure stages 54 and 49, respectively. More specifically and with continued reference to FIG. 5, compressed gas within a compression chamber 120 of stage 46 discharges through a check valve 122 into a line 124 and from the line through a second check valve 126 into a compression chamber 128 of stage 52 of isomer 44. The second stage of compression in isomer 42, stage 48, discharges from a compression chamber 138 through a check valve 140 into a line 142 and through a check valve 144 into a compression chamber 146 of stage 54. In isomer 44, stage 50 discharges from its compression chamber 148 through a check valve 150 into a line 152 and from the line through a check valve 154 into compression chamber 138 of stage 48. Similarly, compressed gas in chamber 128 discharges through a check valve 156 into a line 158 and from the line and through a check valve 160 into a comrpression chamber 162 of high pressure stage 49 of isomer 42.

The outlet of the highest compression stage in both isomer discharges to some desired delivery point, say, tanks to be charged with the gas. The outlet from compression chamber 162 goes through a check valve 164 and into a line 166. Similarly, the outlet from compression chamber 146 leaves high pressure stage 54 through a check valve 168 and passes into a line 170. The gas from lines 166 and 170 enter a pressure control valve 171 which is preset to emit gas at some specified pressure into line 172.

The inlet for both compressor isomers is from a line 174 from a source of low pressure gas. A pair of blow-by return lines 176 and 178 from the blow-by collection manifolds of isomers 42 and 44 pass into compression chambers 120 and 148, respectively. Gas from line 174 passes into lines 180 and 182. Gas from line 180 passes through a check valve 184 into compression chamber 120. Gas from line 182 passes through a check valve 186 into compression chamber 148.

With reference again to FIG. 2, recirculating ball bearing nut 82 has an axially extending, annular shoulder 190 facing the center of the drive. Similarly, recirculating ball bearing nut 84 also has an axially extending, annular shoulder 192 which faces the center of the drive. Sleeve 86 is secured to recirculating ball bearing nuts 82 and 84 at the shoulders of the nuts as through dowels 194.

An important aspect of the present invention is in converting purely rotational, unidirectional, constant speed motion to purely linear reciprocation in an efficient manner.

Recirculating ball bearing nuts 82 and 84 and screws 70 and 72 provide an efficient means of converting unidirectional rotary to linear reciprocation. That is, friction losses are low through the operation of the recirculating ball bearing nuts and screws. Recirculating ball bearing nuts and screws are well known devices for producing very low friction between the threads of a nut and the threads of a screw. With the low friction there is the capability of an efficient drive of the nut or the screw by the other. Obviously, other low friction devices may be used to drive a nut or a screw by rotation of one with respect to the other. Needle bearings mounted in a nut to track in the threads of a screw is one example. Tapered rollers acting on the faces of the screw threads and mounted in the nut is another example. Whatever means are used to provide a low friction coupling between a nut and a screw, a low friction coupling is fundamental to the drive used with the pump of the present invention, for it provides good efficiency in converting rotary motion to linear motion.

Continuing with the description, guide rods 102 for preventing rotation of pilot plates 60 and 71 are secured as through fastener sets 196 and 198 to lateral plates 104 and 106, respectively. The rods extend through low friction linear bushing sets 200 and 202 in pilot plates 60 and 71, respectively. A sufficient number of guide rods are provided to resist angular displacement of the pilot plates when brakes 79 and 80 are individually applied.

As previously mentioned, the pilot plates are coupled together for reciprocation through a plurality of tie rods 81. The tie rods are each threaded and secured to pilot plate 60 as through nuts 206 and 208 on the threads and on each side of the plate. The tie rods are secured to pilot plate 71 as through nuts 210 and 212 on threads of the tie rod and on each side of the plate.

Dust covers (not shown) may be used to protect the threads of screws 70 and 72. A number of forms of dust cover may be used but one suitable type resembles a coil spring axially extended and secured at the lateral and pilot plates.

The cylinder of each compression stage is held in place between the medial and lateral plates. Thus, the cylinder for stage 46, indicated by reference numeral 205, is mounted in place between lateral plate 104 and medial plate 96. On the compression chamber side, medial plate 96 is recessed at 207 to seat and seal the cylinder in place.

Each piston, as typified by piston 58, has one more pairs of annular seals 209 to seal the compression chamber from the low pressure chamber side opposite it.

Each piston is connected to its piston rod in the manner shown for piston 58 and piston rod 56 by a fastener such as fastener 211. To prevent leakage through the lateral plate, each piston rod passage has a low pressure seal constitent with the containment of blow-by gas, such as O-ring 213 in lateral plate 104 for piston rod 56. Each piston rod passage is provided with a low friction bushing such as bushing 214 in lateral plate 104 for piston rod 56.

Each piston rod is secured to its pilot plate as by threads in the manner shown at 216 for piston rod 56 and may be provided with wrenching flats, such as wrenching flats 218 for piston rod 56, for installation and removal. Shoulders on the piston rods serve to properly index their pistons. Thus, shoulder 220 of piston rod 56 is received in a recess in pilot plate 60 and bears against the plate. A thrust bearing 221 is provided between a radial shoulder 222 of screw 70 and pilot plate 60 for low frictional thrust radial coupling of the screw with the pilot plate.

Each pilot plate is properly indexed with respect to its associated screw by providing a shoulder on the screw for the pilot plate bearing to abut against. This is shown for pilot plate 60 and screw 70 at 222.

For low riction, each of the tie rods 81 is received in linear bushing 223 in the lateral and medial plates.

Brake 79, the left-hand brake illustrated in FIG. 2, has an armature 224 which is capable of longitudinal, axial movement toward and away from a stator 226. Armature 224 is mounted on an armature carrier 228 and preloaded by an annular spring 229. The spring biases the armature away from the stator, but articulates with the attraction of the armature towards the stator by electromagnetic force of a coil 230. The engaging faces of the armature and the stator are shown at reference numerals 232 and 234, respectively. If desired, a suitable friction coating and long wearing material may be used to augment the braking action and extend the life of the brake at these friction surfaces. Stator 226 has an annular, axially extending, outer shell 236 which encompasses the radial exterior of coil 230. The stator also has an annular, axially extending, interior shell 238 around which the annular coil is limited. An interior annular spacer 240 is received on a reduced diameter section of screw 70 and provides support for armature carrier 228. A needle bearing 242 between spacer 240 and pilot plate 60 provides for a low friction axial coupling of the two, while permitting the rotation of the spacer with the screw. A spacer ring 244 circumscribes and locates the needle bearing concentric with the axis of screw 70. A castellated nut 246 secured on threads to the end of screw 70 secures the brake armature assembly to the screw and to the pilot plate. The brake stator is attached to the pilot plate with fasteners.

Brake 80 for the right side of the drive shown in FIG. 2 is identical in construction to brake 79, just described. As such, its description will be limited. The brake has an armature 248 mounted through a spring 249 to an armature carrier 250, which in turn is held in place by a castellated nut 252. An interior spacer, not illustrated, provides axial bearing for the interior end of the armature carrier. Castellated nut 252, secured to threads of screw 72, anchors the armature assembly. A stator assembly 254 and a coil housing 256 provide the balance of the visible portion of the illustrated brake.

An appropriate circuit for effecting alternate activation of brakes 79 and 80 at the initiation of their power strokes at the inner end of their cycles is illustrated in FIG. 6.

Motor 90 is in series circuit with a source of alternating current through an on-off switch 258 and a circuit protecting fuse 260. In parallel with the motor, a DC power supply 262 is in series circuit with the source of alternating current and is itself protected by a fuse 264. The output from DC power supply 262 is wired through a pair of overtravel limit switches 266 and 268. Limit switch 266 may correspond to an overtravel switch for the left side of the drive and will open a circuit to the two brakes 79 and 80 in the event that pilot plate 60 travels beyond a predetermined point. Limit switch 268 provides the corresponding function for the right side of the drive and thus senses overtravel of pilot plate 71 to terminate the circuit to the brakes. In series with the overtravel limit switches and between the overtravel limit switches and ground are two parallel branch circuits 270 and 272 for right and left brakes 80 and 79, respectively.

Branch circuit 270 includes a left rotary switch 274 which is mounted on left screw 70 to close upon sensing rotation of the screw. The rotary switch is in series circuit with a parallel circuit having a series branch of a limit switch 276 and a switching element 278, and a second series branch of a limit switch 280 and a switching element 282. The limit switches are normally closed and open in response to pilot plate 60 reaching its innermost position for switch 276 or some selected intermediate position for switch 280. The switching elements are ganged and determine which of the limit switches is in circuit. The intermediate position is for warmup. Right brake 80 is shown schematically. Thus, when screw 70 rotates, switch 274 closes to energize right brake 80 and prevent screws 72 from rotating with respect to nut 84. Screw 72 will then travel linearly to the left in FIG. 2 until limit switch 276 or 280 opens, whereupon the right brake is dropped out of circuit and screw 72 is freed from nut 84.

Branch 272 is similar to branch 270. It has a right rotary switch 284 mounted on screw 72 to sense the latter's rotation and to close upon sensing its rotation. The limit switch is in series with a parallel circuit of a series branch of a limit switch 286 and a switching element 288, and a second series branch of a limit switch 290 and a switching element 292. The switching elements 288 and 292 are ganged and are ganged with switching elements 278 and 282 for simultaneous switching. Limit switch 286 is responsive to the innermost position of pilot plate 71 to open, but is otherwise closed. During warmup, switch 290 closes at some selected intermediate point. Left brake 79 is indicated schematically. Thus when the drive is to the left in FIG. 2, as just described, and limit switch 276 is open, the right brake is released and consequently screw 72 will begin to rotate. Rotation of screw 72 will close right rotary switch 282 to energize brake 79 and cause the pump to reciprocate to the right in FIG. 2.

In operation, consider that the right-hand isomer has just finished a compression stroke, that is, it has finished its translation to the left in FIG. 2. Gas will enter compression chamber 120 of low pressure stage 46 through check valve 184 from a source of low pressure and gas blow-by. At the same time gas will be discharging from low pressure stage 50 of right isomer 44 through check valve 150 and line 152 into compression chamber 138 of second stage 48 of left isomer 42 through inlet valve 154. Also at this same time, gas is discharging from intermediate compressor stage 52 of the right isomer through check valve 156, line 158, and inlet check valve 160, into high pressure stage 49 of the left isomer. Gas is also being discharged from high pressure stage 54 of the right isomer through check valve 168, line 170 and pressure control valve 171 and then into discharge line 172. The pressure control valve maintains the internal pressure of the system. This provides for a pneumatic spring in the compression chamber of each cylinder to counteract unopposed piston forces. After a slight pause, brake 79 will be activated to stop the rotation of screw 70 to effect relative rotation between the screw and its driving recirculating ball bearing nut 82. Recirculating ball bearing nut 82, being driven by motor 90, will cause screw 70 to translate to the right in FIG. 2 to compress gas in the left-hand isomer. At the end of this compression stroke, brake 79 will be inactivated and brake 80 will be activated after a programmed pause. Compressed gas will be discharged from the compression chambers of isomer 46 in the manner described for isomer 44.

It should be noted that the compressor of the present invention is easily modified to effect compression on both sides of the pistons on alternate strokes thereof.

It should be noted in some applications, especially involving high capacity requirement, that it will be necessary to provide active cooling of the compressor stages. The annulus defined by shells 110 and 112, lateral plate 104 and medial plate 96, and the corresponding annulus in isomer 44 provide an ideal jacket for a cooling medium such as water. In this instance, blow-by gases would, of course, not be collected in the annuli but would be collected in some other manner.

Depending upon the application, this invention can have any number of stages required. Whether one stage of five or more are required the center position of each cylinder stage would be located at some fixed radius from the central axis and periaxial to it so as to be equally spaced from its neighboring cylinder in the manner of FIG. 3. The product of a cylinder's design pressure and that cylinder's cross-sectional area are identical for each stage so that no unbalanced force vectors are introduced, equally spaced equal radius positions are chosen for each cylinder no matter how many stages are required. A single stage system can meet the above requirement by utilizing two single stages by each isomer and connected in parallel.

Figure 7:
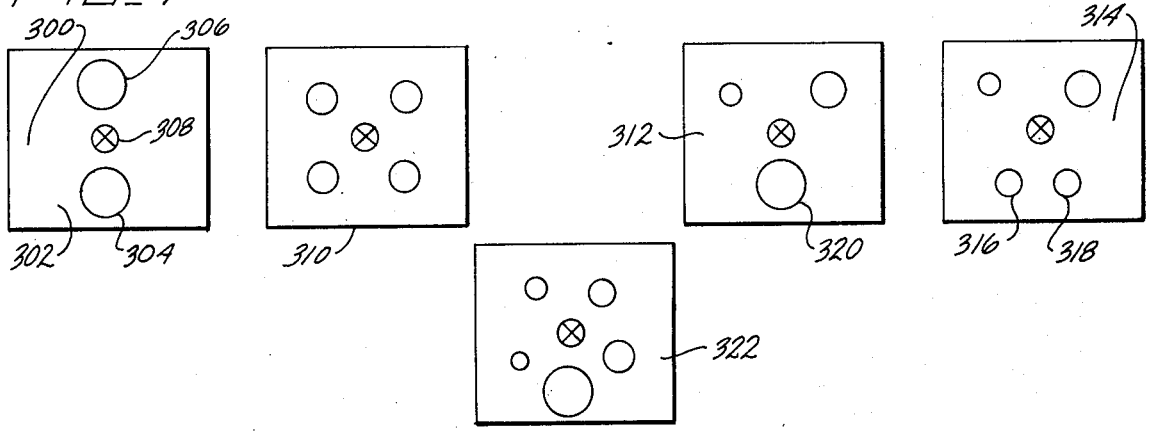
FIG. 7 is a schematic of some of the different cylinder arrangements available in the pump of the present invention.

These principles are illustrated in FIG. 7. In the Figure, reference numeral 300 shows a single stage isomer with a medial plate 302, two single stage cylinders 304 and 306, and a drive screw 308. Reference numeral 310 shows single stage with four cylinders. The three stage embodiment previously described in detail is shown at 312. Three stages can also be effected as illustrated at 314 with the first stage divided into cylinders 316 and 318. Cylinders 316 and 318 total in area the area of first stage cylinder 320 of 312. A five stage isomer is shown at 322. More stages and stage divisions are obviously possible.

As previously mentioned, the compressor of the present invention provides truly linear and oil-free reciprocation of its compressor pistons within the cylinders in which the pistons are disposed. This admits to the use of such seals as filled low friction polymers, such as Teflon, which would otherwise wear out too fast because of the lateral force applied to them in crank or eccentric type reciprocating compressors. With low friction type seals it is desirable that the seals be permitted to expand as by friction heating to properly seat and limit blow-by. This is accomplished by the feature of a variable programmed stroke. By operating the compressor at short strokes for a brief period, piston seals expand and the pneumatic spring condition is assured. At this time, the stroke length is increased to the compressors full capacity condition.

It should be noted that the compression strokes which the reciprocating compressor of the present invention provides can be very long, and consequently very low speed reciprocation rates are possible at reasonable capacities. This is in contrast to a crank-type reciprocating comressor where suitable capacities are only obtained at high speeds. Good capacity at low speeds is a direct result of the higher inherent geometric volume efficiency of the present invention.

Another feature of the present invention attendant with its slow speed operation is that the balls of the check valves may be made of low mass and yet provide an effective valving action. With a high speed compressor, large massive valving members are required to withstand the high forces of impact. But with high speed compressors and with large and massive valving members wear becomes a very important problem. In addition, low reciprocation rates afford long life components and minimal vibration; as a result special foundations for anchoring equipment are obviated. Low reciprocation rates result in quiet operation, as low as 40 db or less.

It should be obvious that the compressor described here is of modular design and can be increased not only in size but in the number of banks. It is preferred, however, that there be an even number of compressor isomers to take full advantage of the nature of the reciprocating drive affording compression in at least two isomers during any cycle of the drive.

It should also be obvious that while the preferred embodiment of the present invention has been described with reference to a compressor that the present invention also embraces pumps for liquids.

The present invention has been described with reference to a certain preferred embodiment. The spirit and scope of the appended claims should not, however, necessarily be limited to the foregoing description.

What is claimed is:

1. An improved reciprocating pump for increasing the energy of a fluid comprising:
   a. a bank having at least one piston and cylinder, the piston being translationally received in the cylinder;
   b. fluid inlet means to the cylinder for the admission of a fluid thereinto;
   c. fluid outlet means from the cylinder for discharging fluid therefrom;
   d. a drive for reciprocating the piston within the cylinder and increasing thereby the energy of the fluid, the drive comprising a first and a second pair of nuts and screws with the nut of each pair being threadably received on its associated screw, the second pair being threaded opposite to the first, of each nut and screw pair one being a drive member and one being a driven member;

e. low friction means between the threads of each nut and the threads of its associated screw for reducing friction losses;

f. means for driving the drive members in rotation;

g. means for preventing linear translation of each of the drive members with respect to its driven member;

h. means for alternately producing rotation of each of the drive members with respect to its driven member to produce linear motion of its driven member;

i. means for coupling the driven members together for reciprocation together; and j. means for coupling the driven members to the piston for reciprocation of the piston with the driven members.

2. The improved reciprocating pump for increasing the energy of a fluid claimed in claim 1 wherein in each nut and screw pair the nut is the drive member and the screw is the driven member.

3. The improved reciprocating pump for increasing the energy of a fluid claimed in claim 2 wherein the low friction means for each nut and screw pair includes recirculating balls in the threads between each nut and screw.

4. An improved reciprocating pump for increasing the energy of a fluid comprising:

a. a first bank having at least one piston and one cylinder, the piston being translationally received in the cylinder, fluid inlet means to the cylinder for the admission of a fluid thereinto, and fluid outlet means from the cylinder for discharging fluid therefrom;

b. a second bank having at least one piston and cylinder, the piston being translationally received in the cylinder, fluid inlet means to the cylinder for the admission of a fluid thereinto, fluid outlet means from the cylinder for discharging fluid therefrom;

c. a first screw and a first nut, the first nut being threadably received by the first screw;

d. low friction means between the threads of the first nut and the threads of the first screw;

e. a second screw and a second nut, the second nut being threadably received in the second screw and the second nut being oppositely threaded from the first screw and the first nut;

f. low friction means between the threads of the second nut and the threads of the second screw;

g. means coupling the first and the second screws together for linear movement together;

h. means coupling the first screw to the first piston for linear movement together;

i. means coupling the second screw to the second piston for linear movement together;

j. means to effect relative rotation between the first nut and the first screw to produce linear movement of the first screw with respect to the first nut in a first linear direction along the axis of the first screw;

k. means to effect relative rotation between the second nut and the second screw to produce linear movement of the second screw with respect to the second nut in a second linear direction along the axis of the second screw opposite the first direction;

l. means for alternately effecting the relative rotations between the first nut and the screw and the second nut and the screw to produce reciprocation of the first and second screws and thereby reciprocation of the first and second pistons; and m. means to rotate the nuts and screws.

5. The improved reciprocating pump for increasing the energy of a fluid claimed in claim 4 wherein the means to rotate the nuts is capable of rotating the nuts in one direction at a constant speed.

6. The improved reciprocating pump for increasing the energy of a fluid claimed in claim 5 wherein the low friction means for the first and the second nuts and screws comprises recirculating balls in the threads between each nut and screw.

7. The improved reciprocating pump for increasing the energy of a fluid claimed in claim 6 wherein the inlet and outlet means to the cylinders comprise inlet and outlet check valves for each cylinder, the check valves having a valving element which is normally closed but responding respectively to a predetermined inlet pressure and a predetermined outlet pressure.

8. The improved reciprocating pump for increasing the energy of a fluid claimed in claim 7 including means for varying the limits between the extremes of reciprocation of each of the pistons.

9. An improved reciprocating pump for increasing the energy of a fluid comprising:

a. a first bank having a plurality of stages with each stage having a piston and a cylinder, the piston of each stage being translationally received in its associated cylinder, fluid inlet means to each of the cylinders for admission of a fluid thereinto at a predetermined inlet pressure, and fluid outlet means from each of the cylinders for discharging fluid therefrom at a predetermined outlet pressure;

b. a second bank having a plurality of stages corresponding in number to the number of stages of the first bank with each stage of the second bank having a piston and a cylinder, the piston of each stage being translationally received in its associated cylinder, fluid inlet means to each of the cylinders for the admission of a fluid thereinto at a predetermined inlet pressure, and fluid outlet means from each of the cylinders for discharging fluid therefrom at a predetermined outlet pressure;

c. a first nut and a first screw, with the first nut being threadably received in the first screw, and low friction means between the threads of the first nut and the threads of the first screw;

d. a second screw and a second nut, the second nut being threadably received in the second screw and the second screw and the second nut being oppositely threaded from the first screw and the first nut, and low friction means between the threads of the second nut and the threads of the second screw;

e. means coupling the first and the second screws together for linear movement together;

f. means coupling the first and second screws to the pistons of the first and second banks for linear movement together;

g. means to effect relative rotation between the first nut and the first screw to produce linear movement of the first screw with respect to the first nut in the first linear direction along the axis of the first screw;

h. means to effect relative rotation between the second nut and the second screw to produce linear movement of the second screw with respect to the second nut in a second linear direction along the axis of the second screw opposite the first direction;

i. means for alternately effecting the relative rotation between the first nut and screw and the second nut and screw to produce reciprocation of the first and second screws; and j. means to rotate the nuts and screws.

10. The improved reciprocating pump for increasing the energy of a fluid claimed in claim 9 wherein the means for coupling the pistons of each bank to the screws includes a first and a second pilot plate secured respectively to the first and second screws and to the pistons of the first and second banks.

11. The improved reciprocating pump for increasing the energy of a fluid claimed in claim 9 wherein the stages in each bank increase progressively from a low pressure stage to a high pressure stage, and wherein the outlet of each stage except for the high pressure stage is the inlet to the next higher pressure stage in the opposite bank.

12. The improved reciprocating pump for increasing the energy of a fluid claimed in claim 9 wherein the stages in each bank progress from a low pressure stage to a high pressure stage and means is provided for connecting the outlet means of a lower stage cylinder to the inlet means of the next higher stage cylinder in the opposite bank.

13. The improved reciprocating pump for increasing the energy of a fluid claimed in claim 9 wherein means is provided to vary the length of reciprocation.

14. The improved reciprocating pump for increasing the energy of a fluid claimed in claim 9 including Teflon seals between each of the pistons and its cylinder to prevent fluid from passing along the interface between the two.

15. The improved reciprocating pump claimed in claim 9 wherein means is provided for each bank for enclosing the cylinders to define a closed space common to all the cylinders in the bank.

16. An improved reciprocating pump for increasing the energy of a fluid comprising:

a. a base;

b. first and second parallel medial plates secured to the base;

c. first and second parallel lateral plates secured to the base with the medial plates between them;

d. a central axis passing through each of the plates;

e. a first and a second plurality of piston and cylinder combinations mounted periaxially to the central axis between the first medial and first lateral plates and the second medial and second lateral plates, respectively, the first plurality equaling the second plurality, each piston and cylinder in the first plurality having a corresponding piston and cylinder in the second plurality, fluid inlet means into each cylinder for admitting fluid thereinto at a predetermined inlet pressure for the cylinder, and fluid outlet means for each cylinder for discharging fluid therefrom at a predetermined outlet pressure for the cylinder;

f. first and second oppositely threaded screws translationally disposed coaxially with the central axis in the first medial and first lateral plates and the second medial and second lateral plates, respectively;

g. first and second nuts received on the threads of the first and second screws, respectively, and rotatably mounted between the medial plates against translation;

h. first and second low friction means between the threads of the first nut and screw and the threads of the second nut and screw, respectively;

i. first and second pilot plates secured to the first and second screws, respectively, outwardly of the lateral plates;

j. means securing the pilot plates together for translation together;

k. first and second brake means for selectively preventing rotation of the first and second screws, respectively, with respect to their associated nuts;

l. means for rotating the nuts; and m. means for alternately activating the brake means to reciprocate the pistons.

17. The improved reciprocating pump claimed in claim 16 wherein each of the first and second piston and cylinder combinations increases progressively from a low pressure piston and cylinder to a high pressure piston and cylinder, and means is proivded for connecting the outlet means of a lower pressure cylinder to the inlet means of the next higher pressure cylinder in the opposite piston and cylinder combination.

18. The improved reciprocating pump claimed in claim 17 wherein an inner and an outer shell between each medial plate and lateral plate enclose the first and second piston and cylinder combinations.

19. The improved reciprocating pump claimed in claim 18 wherein the inlet and outlet means to each cylinder comprises check valves.

20. The improved reciprocating pump claimed in claim 18 including means from each cylinder to discharge blow-by fluid into the space between the shells.

21. The improved reciprocating pump claimed in claim 20 including means to introduce blow-by fluids from the shells into in inlets of the cylinders.

* * * * *

PO-1050
(5/69)

UNITED STATES PATENT OFFICE
CERTIFICATE OF CORRECTION

Patent No. 3,771,918      Dated Nov. 13, 1973

Inventor(s) Augustus P. Winter

It is certified that error appears in the above-identified patent and that said Letters Patent are hereby corrected as shown below:

In the specification: Column 1, line 8, "pump" should be --pumps--; line 17, "shown" should be --known--; line 23, "cofining" should be --confining--. Column 2, lines 59 and 60, "simpler" should be --simple--. Column 3, line 55, before "collection" insert --a--. Column 4, line 36, "class" should be --classic--. Column 6, line 14, "plate" should be --plates--; line 42, "its" should be --it--; line 58, "furthermore" should be --furthermost--. Column 7, line 53, "comrpression" should be --compression--. Column 9, line 7, "constitent" should be --consistent--; line 28, "riction" should be --friction--. Column 12, line 19, "comressor" should be --compressor--.

In the claims: Claim 17, column 16, line 37, "proivded" should be --provided--.

Signed and sealed this 23rd day of April 1974.

(SEAL)
Attest:

EDWARD M.FLETCHER,JR.
Attesting Officer

C. MARSHALL DANN
Commissioner of Patents